(No Model.)  5 Sheets—Sheet 1.

M. JENSEN.
MACHINE FOR MAKING NETS.

No. 583,114.  Patented May 25, 1897.

Witnesses,
Inventor,
Mathias Jensen (No Model.) 5 Sheets—Sheet 3.

M. JENSEN.
MACHINE FOR MAKING NETS.

No. 583,114. Patented May 25, 1897.

Witnesses,

Inventor,
Mathias Jensen
By Dewey & Co.
Attys

(No Model.) 5 Sheets—Sheet 4.

M. JENSEN.
MACHINE FOR MAKING NETS.

No. 583,114. Patented May 25, 1897.

Witnesses,
Inventor,
Mathias Jensen
By Dewey & Co
Attys

(No Model.) 5 Sheets—Sheet 5.

M. JENSEN.
MACHINE FOR MAKING NETS.

No. 583,114. Patented May 25, 1897.

Witnesses,
G. H. Nurse
H. F. Ascheck

Inventor,
Mathias Jensen
By Dewey & Co.
Atty

UNITED STATES PATENT OFFICE.

MATHIAS JENSEN, OF ASTORIA, OREGON, ASSIGNOR TO C. NURNBERGER & CO., OF CHICAGO, ILLINOIS.

MACHINE FOR MAKING NETS.

SPECIFICATION forming part of Letters Patent No. 583,114, dated May 25, 1897.

Application filed August 25, 1896. Serial No. 603,838. (No model.)

*To all whom it may concern:*

Be it known that I, MATHIAS JENSEN, a citizen of the United States, residing at Astoria, county of Clatsop, State of Oregon, have invented an Improvement in Machines for Making Nets; and I hereby declare the following to be a full, clear, and exact description of the same.

My invention relates to net-machines.

The object of my invention is to produce netting from threads, twine, or cords in a rapid and effective manner, with either the double or the single knots.

My invention consists, essentially and principally, of a cylinder with rows of pegs upon its periphery to receive the knots, a row of prongs or fingers through which warp-threads are conveyed from spools or balls and connected with said pegs, a row of spools carrying weft-threads that also connect with these pegs, and two rows of hooks to carry the threads from the shuttles around the prongs or fingers and from the latter around the shuttles and then draw it into knots on said pegs at one side of the cylinder, while the row of previously-formed knots are disengaged from the pegs on the opposite side by means provided for that purpose.

It also consists in details of construction, arrangement, and combination, which I shall hereinafter fully describe and specifically claim.

Referring to the accompanying drawings.

Figure 1:
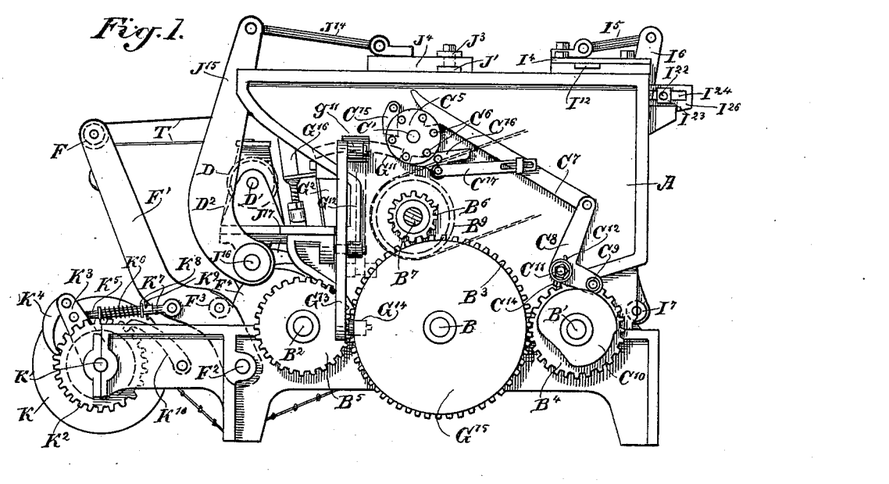
Figure 1 is a side elevation.
Figure 2:
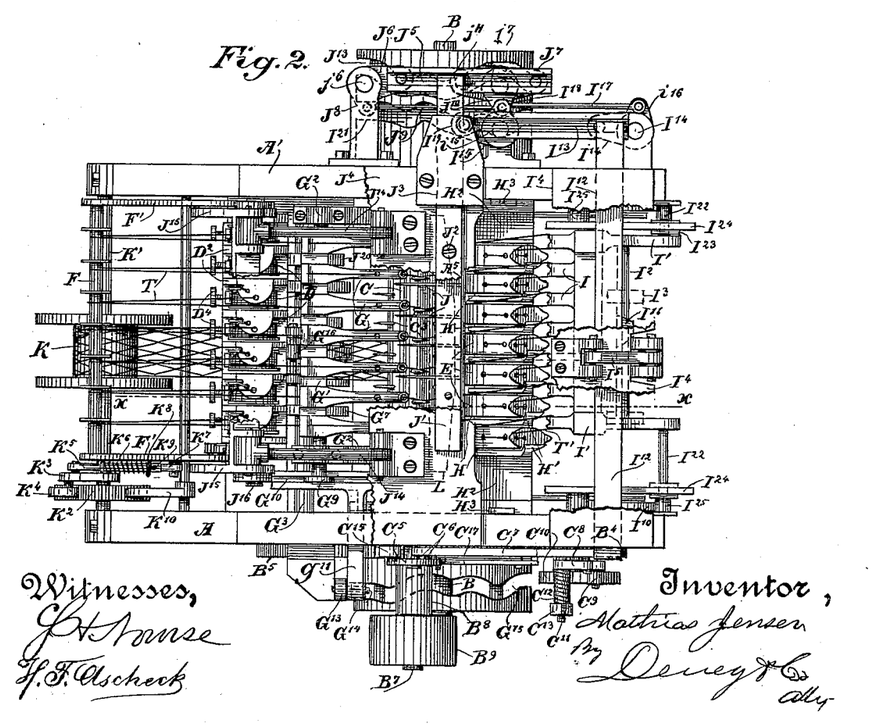
Fig. 2 is a plan or top view.
Figure 3:
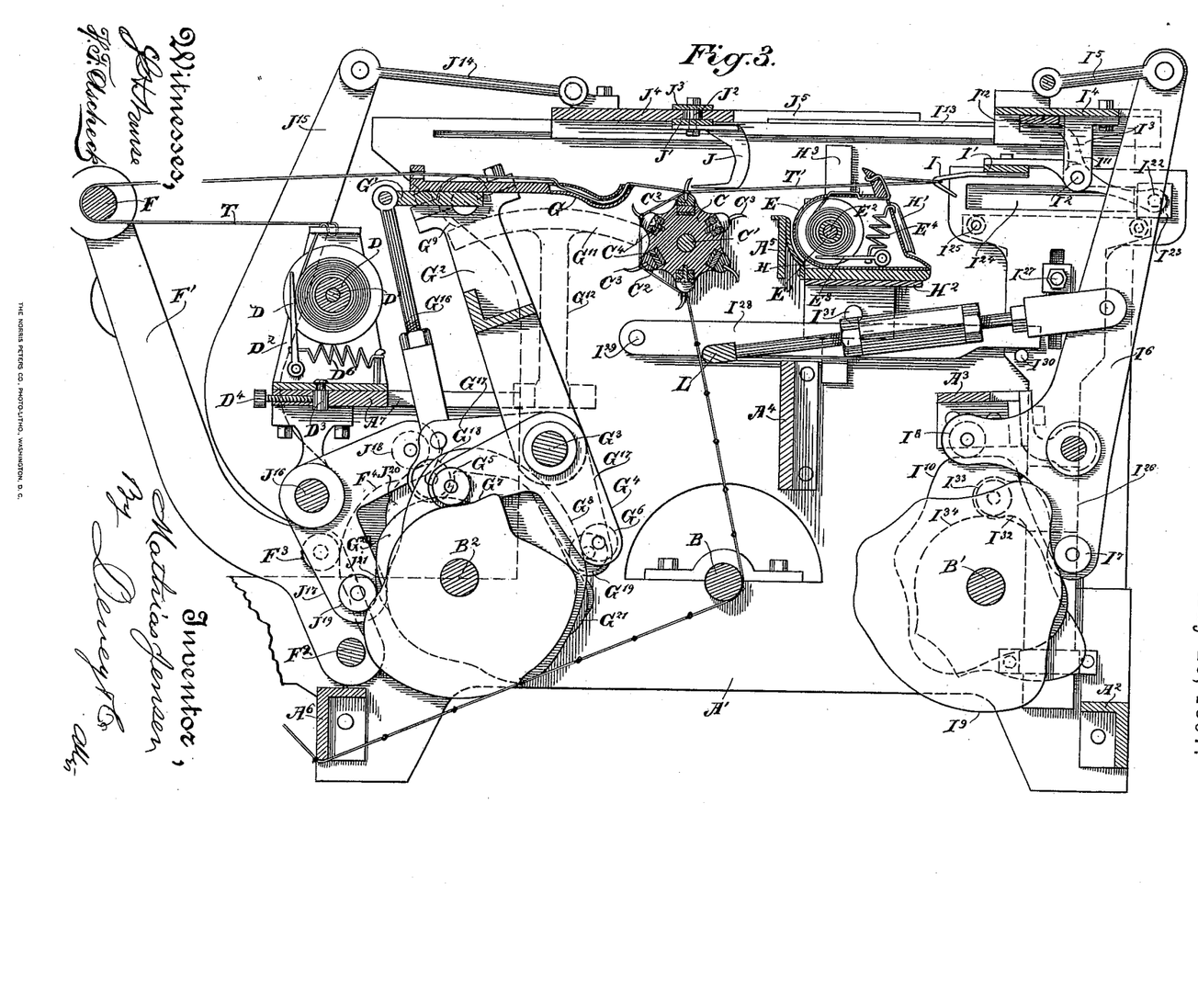
Fig. 3 is a longitudinal vertical section on the line $x\ x$ of Fig. 2.

The frame consists of two main side pieces A and A', which are connected by suitable cross-bars designated by $A^2$, $A^3$, $A^4$, $A^5$, $A^6$, and $A^7$, Fig. 3. Three axles B B' $B^2$ are journaled in bearings on the side pieces A and A', Figs. 1 and 3. Upon the axle B is secured a main gear $B^3$, which meshes on each side with two smaller gears $B^4$ and $B^5$, which are secured upon the axles B' and $B^2$, respectively, Fig. 1. These gears are relatively proportioned, so that the axles B' and $B^2$ will have imparted to them two revolutions to one of the axle B. A small pinion $B^6$ meshes with the main gear $B^3$, and said pinion is mounted to turn upon the fixed spindle $B^7$, secured to the side piece A, Figs. 1, 2, and 4. The pinion $B^6$ is provided with a long hub $B^8$, on which the driving-pulley $B^9$ is mounted, Fig. 2, so that the revolution of said pulley will impart motion to the three axles B B' $B^2$ and said axles carry all the cams which actuate the several mechanisms.

In the upper portion of the frame is the peg-cylinder C, Figs. 3 and 2. This is secured upon an axle C', which is mounted to turn in bearings secured to the frame-pieces A and A', and said cylinder is provided with a number of longitudinal grooves—say, for example, six—and in each of said grooves is a bar $C^2$, and to each bar is secured as many pegs $C^3$ as the number of knots the machine is designed to make simultaneously, and in addition thereto there is one extra peg for holding the selvage-threads in position, Fig. 3. Under each longitudinal bar $C^2$ is a packing $C^4$, against which the bar $C^2$ is tightened, whereby the diameter of the cylinder may be increased or diminished to change the size of the meshes of the net, Fig. 3. It is upon these pegs that the knots are made, and in order to place each of the six rows of pegs $C^3$ in position successively to receive the knots there is on the outer side of one of the frame sides a disk $C^5$, which is mounted upon the shaft or axle C', Figs. 1 and 4. This disk is provided with six fixed pins $C^6$, and with these is adapted to successively engage a long pawl $C^7$, the lower extremity of which is pivoted to the upright arm of an elbow-lever $C^8$, which carries in its lower or horizontal arm a friction-roller $C^9$, said roller impinging on the periphery of a cam $C^{10}$, Fig. 1. The elbow-lever $C^8$ is pivotally mounted and adapted to oscillate upon a pin $C^{11}$, secured to the frame side A. A coil-spring $C^{12}$, Fig. 2, surrounding the pin $C^{11}$, is fastened at one end to the elbow-lever $C^8$ and at the other end to a collar $C^{13}$, which is fastened by a set-screw $C^{14}$, threaded in the collar against the pin, Fig. 4. The tendency of the spring is to hold the friction-roller $C^9$ against the cam $C^{10}$, and said cam moves the elbow-lever $C^8$ intermittently, whereby the pawl $C^7$ will push, successively, one of the six pins $C^6$, which moves the cylinder C over each row of pegs $C^3$ to receive the knots in succession.

In order to prevent the cylinder C from turning either way while the knots are drawn on the pegs, a pawl $C^{15}$, Fig. 1, is mounted on a pin secured to the frame side A, and said pawl engages with the pin $C^6$ and prevents the cylinder C from moving backward, while another pawl $C^{16}$ is similarly arranged to prevent the cylinder from moving forward. The last-named pawl $C^{16}$ is connected by a link $C^{17}$, Fig. 1, to the long pawl $C^7$, whereby said pawl $C^{16}$ is intermittently and successively thrown out of engagement with the pins $C^6$, which pass by at a time when there is no pull on the threads which would cause the cylinder to move forward.

The warp-threads T are carried by a row of spools D, and said threads connect with the pegs $C^3$. Each spool is mounted and adapted to turn on a fixed pin $D'$, secured in a stall $D^2$, Figs. 2, 3, and 5. A pin $D^3$ is secured to the bottom of each stall and passes through a hole in the frame part $A^7$, and a set-screw $D^4$ is threaded in that frame part, one against each of said pins $D^3$, whereby the stalls are properly secured to the frame, Fig. 3. A finger $D^5$ is held yieldingly by a spring $D^6$ against the thread in each spool to secure the proper tension on the threads, Fig. 3.

$T'$ are the weft-threads, Fig. 3. These are carried by a row of shuttles E, provided with spools $E'$, and said threads also connect with the pegs $C^3$. Each spool $E'$ is mounted to turn on its pin $E^2$, which is fixed in the shuttle, and the tension on the threads is likewise secured by fingers $E^3$ and coil-springs $E^4$, Fig. 3.

A thread-guiding spindle F is mounted to turn in the upper ends of two arms $F'$, the lower ends of said arms being secured to a cross-axle $F^2$, that is journaled below in the frame parts A and $A'$, Figs. 3, 2, and 5. Each of the arms $F'$ carries a friction-roller $F^3$, which impinges upon the periphery of a cam $F^4$, one at each side of the machine.

The warp-threads T are passed around the guiding-spindle F and by their tension hold the friction-rollers $F^3$ against the cams $F^4$, while the latter by their eccentricity will push the rollers back and cause the arms and the spindle which they carry to vibrate back and forth at proper intervals.

G are the prongs or fingers, Fig. 3. There is a horizontal row of these secured on the bar $G'$, said bar having a turned part at each end which is mounted in bearings on the upper ends of two levers $G^2$, the lower ends of which are secured on an axle $G^3$, which is journaled in bearings secured to the frame at each side of the machine, Fig. 3. To this axle $G^3$ is secured an elbow-lever $G^4$, which carries in its extremities two friction-rollers $G^5$ and $G^6$, which impinge upon two cams $G^7$ and $G^8$, respectively, which said cams are secured upon the axle $B^2$. By these connections the prongs or fingers G have imparted to them an oscillating movement at right angles to the line of the axle $B^2$ in conformity with the eccentricity of the cams $G^7$ and $G^8$.

Figure 4:
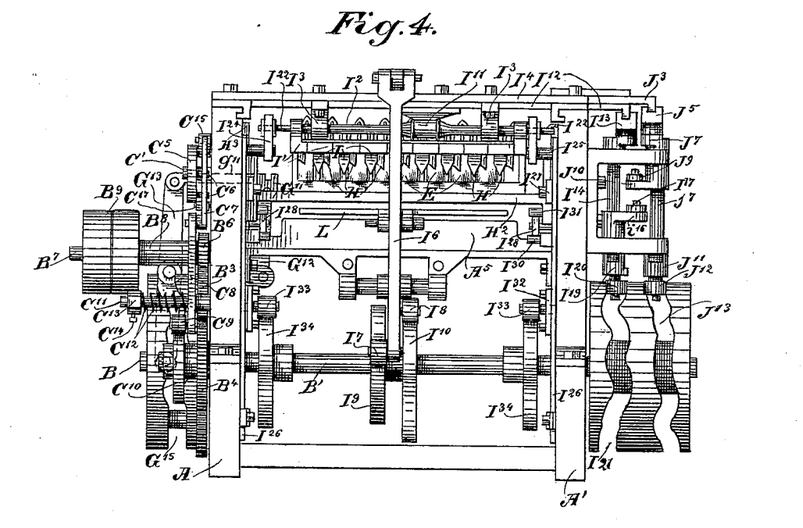
Fig. 4 is an elevation of one end of the machine.
Figure 5:
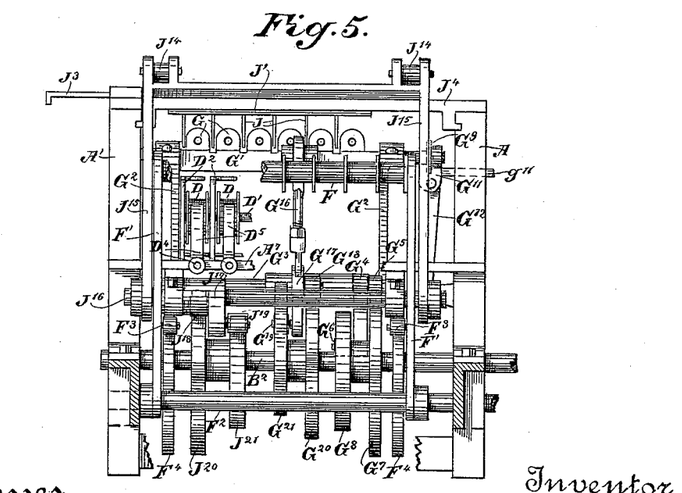
Fig. 5 is an elevation of the other end.

On one end of the bar $G'$ is fixed a collar $G^9$, Figs. 2 and 5, which projects into a groove $G^{10}$ on the top of a T-shaped piece $G^{11}$, Figs. 2 and 3, which is pivoted to the upper end of a lever $G^{12}$, Fig. 5, extending down inside the frame and pivoted at its lower end thereto, and said T-shaped piece $G^{11}$ is also pivotally connected, by means of an arm $g^{11}$, Fig. 2, with the upper end of arm $G^{13}$, Figs. 1 and 4, extending down outside the frame-piece and pivotally connected and carrying at its lower end the friction-roller $G^{14}$, which travels in the groove of a cam $G^{15}$, secured on the axle B, Fig. 2. By these connections the prongs or fingers G have also a movement at right angles to that previously described as being imparted by the cams $G^7$ and $G^8$—that is to say, from side to side of the machine—in conformity with the curve of the groove in the cam $G^{15}$. The bar $G'$ is also connected by a rod $G^{16}$ to an elbow-lever $G^{17}$, Fig. 3, which is mounted loosely on the axle $G^3$, said elbow-lever carrying two friction-rollers $G^{18}$ and $G^{19}$, which impinge on the peripheries of two cams $G^{20}$ and $G^{21}$, Figs. 3 and 5, respectively, secured to the axle $B^2$, whereby by these connections the prongs or fingers G have also a vertical movement in conformity with the eccentricity of the cams $G^{20}$ $G^{21}$ in addition to the oscillating movement imparted by the cams $G^7$ and $G^8$ and the sidewise movement imparted by the cam $G^{15}$, as previously described.

The shuttles E are mounted in a row of stalls H with projecting lips $H'$, Figs. 2, 3, and 4, and said row of stalls is fastened on a carrier $H^2$, the ends of which are mounted and adapted to slide vertically on two tracks $H^3$, secured to the inner surface of the frame sides, Fig. 3. Each stall forms, practically, a square box, open on top, so that the shuttle may be dropped therein or lifted vertically therefrom when desired. The lips $H'$ project sufficiently over each shuttle to prevent the latter from being drawn out of the stalls by any pull which takes place in forming the knots and leave sufficient room for the threads to pass around the shuttles.

I represents a row of hooks, the function of which is to draw loops of the weft-threads from the shuttles and pass them around the prongs or fingers G, then draw loops from the prongs or fingers and pass them around the shuttles, then release or cast these off and draw other loops from the shuttles by which to draw the first loops into a row of knots, all as I shall hereinafter more fully describe. These hooks I are secured in a row to a yoke I', fixed on an axle I², mounted and adapted to oscillate in boxes I³, Figs. 4 and 3, depending from a carrier I⁴, which is mounted and adapted to slide on top of the frame sides A and A'.

The carrier I⁴ is connected by a rod I⁵ to the upper end of a swinging arm I⁶, which is pivoted to the cross-frame part A³ and carries at its lower end two friction-rollers I⁷ and I⁸, Fig. 3, which impinge on the peripheries of two cams I⁹ and I¹⁰, respectively, secured on the axle B', and by these connections the hooks I have a horizontal movement in conformity with the eccentricity of the cams I⁹ and I¹⁰.

Centrally pivoted to the axle I² is the lower end of an arm I¹¹, the upper end of which is fastened to a bar I¹², which is mounted in and adapted to slide sidewise under the carrier I⁴, Fig. 3. One end of this bar I¹² projects outwardly through one end of the carrier I⁴ to the outside of the frame and is there bent downwardly and projects into and is adapted to slide in a grooved horizontal bar I¹³, Fig. 2, which is pivoted at each end to crank-arms I¹⁴ and I¹⁵, which are carried by the upper ends of vertical shafts $i^{14}$ and $i^{15}$, respectively, which said shafts are mounted in bearings on the side of the frame side A', Figs. 2 and 4. An arm I¹⁶ is secured to the vertical shaft $i^{14}$ and is connected by a rod I¹⁷ to an arm I¹⁸, secured to the vertical shaft $i^{15}$, whereby both ends of the grooved bar I¹³ will move alike. On the lower end of the shaft $i^{15}$ is a crank-arm I¹⁹, which carries a friction-roller I²⁰, said roller traveling in the groove of a cam I²¹, Fig. 4. By these connections the hooks I will have, in addition to the movement previously described, a horizontal movement at right angles thereto in conformity with the eccentricity or curve of the groove in the cam I²¹.

The yoke I' has a pin I²² secured to each extremity, and said pins pass through sliding buttons I²³, Fig. 3, which are mounted and adapted to slide in the horizontal slots of bars I²⁴, secured one at each side of the machine, and said bars are each secured by studs I²⁵ to other and vertical bars I²⁶, which are mounted and adapted to slide vertically against the frame, to which they are held by guides I²⁷, Fig. 3.

Two levers I²⁸ are mounted on pivots I²⁹, secured to the frame and extending under the shuttle-carrier H². The free ends of these levers I²⁸ rest on pins I³⁰, Fig. 3, secured one to each of the vertical bars I²⁶, and a pin I³¹ is fastened one to each end of the carrier H², which pins project over and rest on the levers I²⁸, by which means the vertical bars I²⁶ are held downward by the weight of the shuttles and their carrier as well as by their own weight. To each of the bars I²⁶ is secured an arm I³², which carries a friction-roller I³³, which impinges on the periphery of a cam I³⁴, one at each side of the machine, Figs. 3 and 4. By these connections the hooks I have also a vertical movement in conformity with the eccentricities of the cams I³⁴, and in addition thereto the shuttles are lifted upward when the hooks I are lowered, or the shuttles are lowered when the hooks are lifted.

Opposing the hooks I is another row of hooks J, the function of which is to assist, as I shall hereinafter describe, the hooks I in keeping the loops in order while the knots are formed and tied. These hooks J are fastened in a row to a bar J', provided with upwardly-extending studs J², which pass and slide through slots in a carrier J⁴ and are fastened to a top bar J³, Fig. 3, said top bar extending at one end from the carrier and is bent downwardly and is fitted and adapted to slide in a grooved bar J⁵, Fig. 2, which is pivoted at its ends to cranks J⁶ and J⁷, carried by vertical shafts $j^6$ and $j^7$, journaled in bearings secured to the frame side A'. Arms J⁸ and J¹⁰ are secured to the shafts and are connected by a rod J⁹, so that both ends of the grooved bar J⁵ will move alike. An arm J¹¹ is secured to the shaft $j^7$, Fig. 4, and carries a friction-roller J¹², which travels in the groove of a cam J¹³. By these connections the hooks J have a horizontally lateral or sidewise movement in conformity with the curves of the grooves in the cam J¹³.

The carrier J⁴ is mounted and adapted to slide on top of the frame sides, and it is connected by two rods J¹⁴, Fig. 3, to the upper ends of two arms J¹⁵, the lower ends of which are secured on an axle J¹⁶, that is mounted in bearings secured to the cross-frame part A⁷. An elbow-lever J¹⁷ is secured upon the axle J¹⁶, and said elbow-lever carries two friction-rollers J¹⁸ and J¹⁹, which impinge upon the periphery of two cams J²⁰ and J²¹, respectively, secured on the axle B², Fig. 3. By these connections the hooks J will have also a forward-and-back movement, which movement is at right angles to that imparted by the grooved cam J¹³, said forward-and-back movement being in conformity with the eccentricities of the cams J²⁰ and J²¹.

K is a reel for receiving the net, Figs. 1 and 2. It is fastened on its axle K', which is journaled at each end of the frame parts A and A'. A ratchet-wheel K² is secured fixedly upon the axle K', and an arm K³, carrying a pawl K⁴, which engages the ratchet-wheel, is mounted loosely on the axle K', Fig. 1. A hollow stem K⁵ is pivoted to said arm K³, while a rod K⁷ is passed inside of the hollow stem and is pivoted to the arm F'. A coil-spring K⁶, surrounding the hollow stem, is contracted against a fixed collar at one end by a loose collar K⁸ against the other, which is held by a pin K⁹, passed through an elongated slot in the stem and secured in the rod K⁷ inside thereof. Thus the arm F', when moved toward the cam K³, will cause the reel K to turn and wind the net thereon until its tension overcomes that of the spring K⁶, when that will yield while the lever F' completes its stroke. A pawl K¹⁰ engages with the ratchet-wheel and is pivoted to the frame part A to prevent the reel from turning backward.

L is a T-shaped pusher, one end of which is pivoted to the lever $I^6$, while its other end is adapted to push the net from off the pegs $G^3$ and tighten the knots at the same time.

Having now explained the construction of the several parts of the machine and their movements, I will now describe the operation by reference to the drawings, showing the successive positions of the prongs or fingers and the hooks which form the threads into the knots over the pegs.

Figures 6, 7, 8:
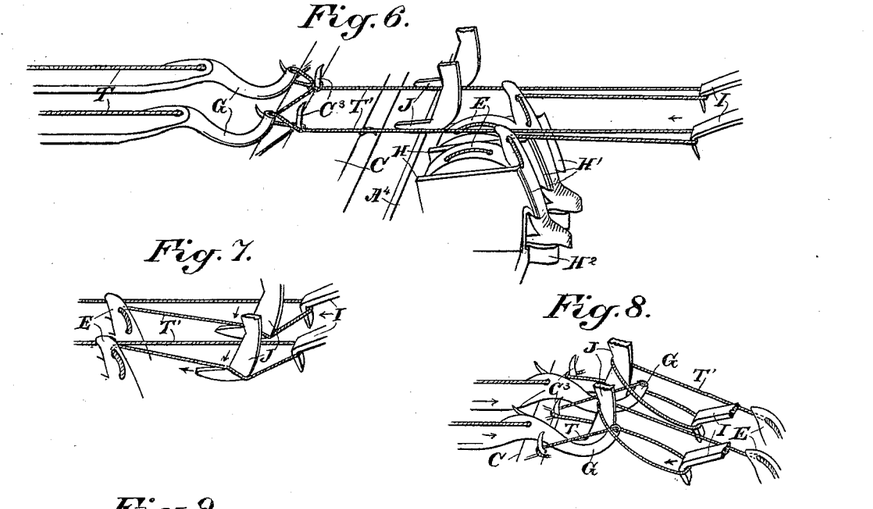
Figs. 6 to 18, inclusive, are views showing the successive positions in the formation of the knots.
Figure 9:
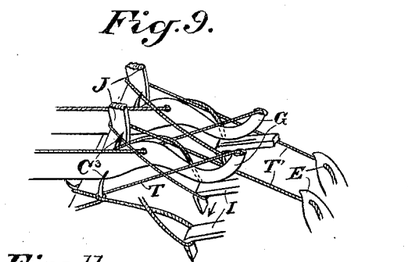
Figure 10:
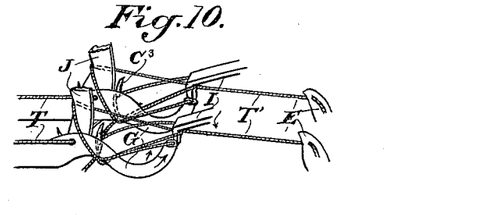
Figure 11:
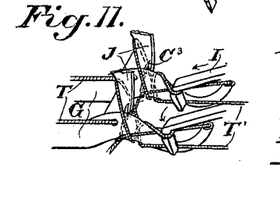
Figures 12, 13:
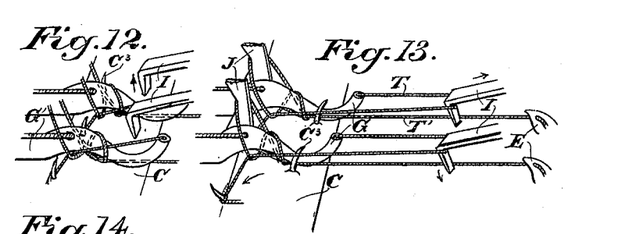
Figure 14:
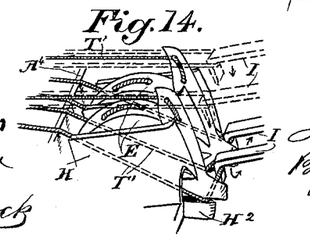
Figure 15:
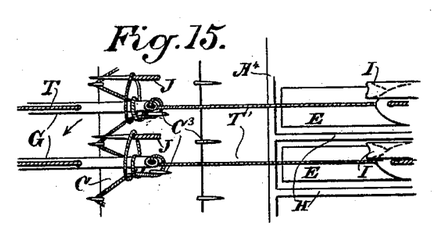
Figure 16:
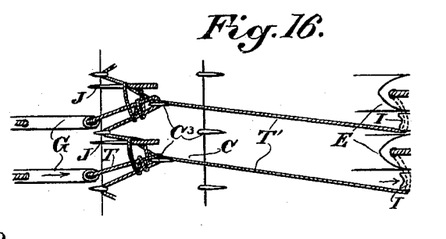
Figures 17, 18:
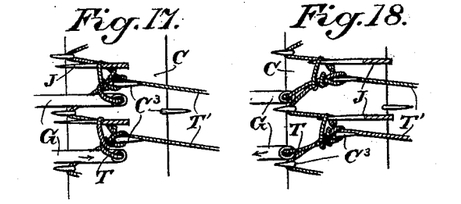
Figure 19:
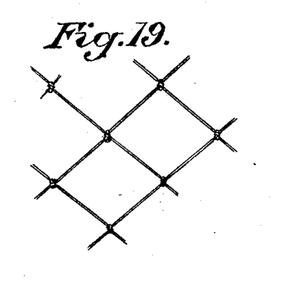
Fig. 19 is a portion of the net product.

When the several parts are in the positions shown in Figs. 3 and 6 and the parts are set in motion, then the hooks J will move to the right past the shuttles E and between the fold or bight of each weft-thread as it extends from the shuttle around the hooks I and back again to the pegs $C^3$, which position is shown in Fig. 7. Now the prongs J move sidewise, so that each will catch one side of the bight of the weft-thread from a shuttle, and when said hooks return the hooks I will follow and the threads carried between them are entered in loops on each of the prongs or fingers G, which at this time are reaching over the cylinder C and meeting the hooks, as seen in Fig. 8. The hooks continue to carry the loops farther onto the prongs or fingers G, as seen in Fig. 9, and while the hooks I have thus been moved toward the cylinder C the pusher L has been moved against the net under the cylinder, whereby the knots previously tied are forced off from the pegs on the lower side of the cylinder and tightened at the same time. The hooks I will each then pass under a prong or finger, and, at the same time moving sidewise, said hooks will rise on the opposite side of said prongs or fingers and, carrying the loops of the weft-threads and moving over again to the first side, will enter said loops a second time on the prongs, as seen in Fig. 10, and the loops are again carried onto the prongs by the hooks I and J, as seen in Fig. 11. The hooks I now leave the loops by moving upward and over the threads in the prongs, then lowering again to catch the threads from the prongs, as seen in Fig. 12, and as said hooks carry a loop from each of the prongs the thread-guiding spindle F follows to give the warp-threads for these loops, and the cylinder C turns at the same time so that its pegs $C^3$ will enter one in each of the loops drawn by the hooks I, as seen in Fig. 13. The hooks I continue to draw on these warp-thread loops and enter one over the point of each shuttle, as seen by dotted lines in Fig. 14. Then the hooks I pull these loops down through between the shuttles and past the heels or lower sides of said shuttles, as seen in full lines in Fig. 14. Now the hooks I move upward to leave or cast off these loops and catch others from the weft-threads of the shuttles for another row of knots, while the spindle F draws the now cast-off loops, which the hooks I left, from under the shuttles and in position as seen in Fig. 15. Now the prongs G move out of the loops which were wound twice around each from thread from the shuttles, and the spindle F draws the threads from the prongs against the pegs $C^3$ while the hooks draw the threads in position, as seen in Fig. 16. At the same time the spindle F, moving backward, causes the reel K to turn and wind onto itself the slack of the net that was previously disengaged by the pusher L moving the knots from the pegs of the cylinders C. The hooks I continue to pull on the weft-threads from the shuttles, and the hooks J yield in the same direction at the same time that the prongs G are pushing the knots close against the pegs of the cylinder, as seen in Fig. 17. Now the prongs move back again while the hooks I are still pulling on the weft-threads to close them on the pegs and on the hooks J, as seen in Fig. 18. Finally, the hooks J pull out of the knots, which are further closed by the hooks I pulling on the threads from the shuttles and the spindle F pulling those from the prongs G, and one row of knots is thus completed with the parts and threads again in the same position as at the beginning of the operation, except that each hook I is now on the opposite side of the threads it holds, as seen in Figs. 15, 16, 17, and 18, and thereafter in a repetition of the operation for the next knots all the side movements of the hooks I and J and the prongs G will be reversed, and so on alternately, so that the threads may lead from knot to knot in zigzag order, as required and as shown in Fig. 19. This alternate reversal of the side movements is accomplished by each half of the cams $B^{15}$, $I^{21}$, and $J^{13}$ having the curve of its groove reversed to each other, and which cams are all three secured on the axle B, which, as before stated, has but one revolution to two of the axles $B'$ and $B^2$, which latter carry all the rest of the cams.

Figures 20, 21:
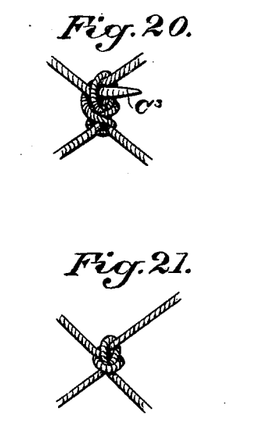
Fig. 20 shows a double knot formed on a peg.
Fig. 21 is a single knot.

In Fig. 20 is shown the double knot formed by the movements hereinbefore described, while in Fig. 21 is shown a single knot, such as will be formed when the loops carried by the shuttles are passed but once around the prongs G, instead of twice, as hereinbefore described.

I have herein shown only sufficient thread-carrying devices to make six knots simultaneously, but these devices may be multiplied so as to make any number of knots simultaneously without increasing any of the devices except the width of the frame to make room for such. The threads which are carried through the prongs may be taken from balls instead of spools, and the pegs on which the knots are tied may be secured on other devices within the cylinder; also, the mechanisms to cause the movements of the various hooks and prongs to form the threads into knots may be constructed differently from that shown and described without departing from the essential features of my invention hereinafter claimed.

It is obvious that the machine may be arranged to carry the threads vertically or on an incline instead of, as here shown, horizontally.

Having thus described my invention, what I claim as new, and desire to secure by Letters Patent, is—

1. In a machine for making nets, the combination of a row of pegs about which the knots are formed, a row of spools for supplying the warp-threads, a row of shuttles for supplying the weft-threads, a row of prongs or fingers for receiving and guiding the warp-threads, two independent rows of hooks adapted to draw a loop of the weft-thread from each shuttle and wind it around a prong or finger and a loop from each prong or finger around a shuttle, and a means for drawing these loops into knots upon the pegs.

2. In a machine for making nets, the combination of a row of pegs about which the knots are formed, a row of spools for supplying the warp-threads, a row of shuttles for supplying the weft-threads, a row of prongs or fingers receiving and adapted to guide the warp-threads, two rows of independently-operating hooks adapted to draw a loop of the weft-thread from each shuttle and wind it around a prong or finger, one of said rows of hooks being further adapted to carry a loop from each prong around a shuttle and cast off said loop, and means for drawing these loops into knots upon the pegs.

3. In a machine for making nets and in combination with the pegs for receiving the knots, the spools and the shuttles for supplying the warp and weft threads respectively, the independently-acting rows of hooks adapted to loop and knot the threads about the pegs, and the prongs or fingers for guiding the weft-threads, the swinging spindle about which the warp-threads pass whereby the loops are drawn into knots on the pegs.

4. In a machine for making nets, the combination of successive rows of pegs adapted to receive successively the knots to be tied upon them, spools and shuttles carrying the warp and weft threads respectively, the prongs or fingers for guiding the warp-threads, said prongs or fingers having a side movement, and a means for reversing said movement for every alternate row of knots tied on the pegs whereby the threads are led from right to left of said knots alternately, and means for uniting the threads into rows of knots on said pegs.

5. In a machine for making nets, the combination of successive rows of pegs adapted to receive successively the knots to be tied upon them, spools and shuttles carrying the warp and weft threads respectively, and the prongs or fingers for guiding the warp-threads, said prongs or fingers having a side movement and a means for reversing said movement for every alternate row of knots tied on the pegs whereby the threads are led from right to left of said knots alternately, and means for uniting the threads into rows of knots on said pegs, consisting of the independently-operating hooks having side movements, and means for reversing said movements to alternate the rows of knots.

6. In a machine for making nets, the combination of a plurality of rows of pegs upon which the knots are formed, spools and shuttles for supplying the warp and weft threads respectively, prongs or fingers carrying the warp-threads to said pegs and two rows of hooks adapted to catch the threads and intermingle their movements with that of the prongs or fingers in such a manner as to draw the thread from said shuttles and prongs or fingers and tie it into knots on said pegs, said hooks having their side movements reversed for every alternate row of knots tied, whereby the threads will alternately lead from right to left of each knot upon successive pegs.

7. In a machine for making nets, the combination of a plurality of pegs upon which the knots are formed and from which they are successively discharged, spools and shuttles for supplying the warp and weft threads, prongs or fingers for carrying the warp-threads, two rows of hooks adapted to loop and knot the threads about the pegs and means for drawing the loops into knots upon said pegs, and a pusher for disengaging previously-formed knots from one row of pegs, while another row is receiving the freshly-formed knots.

8. In a machine for making nets, the combination of a row of pegs, a row of prongs or fingers for carrying the warp-threads, a row of shuttles for supplying the weft-threads, and two rows of independently-operative hooks, said rows of hooks having direct vertical and side reciprocating movements, whereby they are adapted to catch the threads from the shuttles and tie them in knots on the pegs.

9. In a machine for making nets, the combination of a row of pegs upon which the knots are to be formed, a row of shuttles to supply the weft-threads, a row of prongs or fingers to carry and guide the warp-threads, a row of hooks to draw the weft-threads from the shuttles and pass them over the prongs or fingers and from the prongs over the shuttles again, and means by which the shuttles are caused to meet the hooks when the threads are passed over them, and to tie the threads into knots upon the row of pegs.

10. In a machine for making nets, the combination of an intermittently-rotating cylinder provided with successive rows of pegs upon which the knots are adapted to be formed, a row of prongs or fingers for carrying the warp-threads to the pegs, a row of shuttles for supplying the weft-threads to said pegs, and the two rows of independently-operating hooks for forming the threads into knots upon said pegs.

11. In a machine for making nets, the combination of an intermittently-rotating cylinder provided with successive rows of pegs upon which the knots are adapted to be formed, a row of prongs or fingers for carrying the warp-threads to the pegs, a row of shuttles for supplying the weft-threads to said pegs, the two rows of independently-operating hooks for forming the threads into knots upon said pegs, and a means under said cylinder for forcing the previously-formed row of knots from said pegs.

12. In a machine for making nets, the combination of an intermittently-rotating cylinder provided with successive rows of pegs upon which the knots are adapted to be formed, a row of prongs or fingers for carrying the warp-threads to the pegs, a row of shuttles for supplying the weft-threads to said pegs, the two rows of independently-operating hooks for forming the threads into knots upon said pegs, a means under said cylinder for forcing the previously-formed row of knots from said pegs, and a reel for receiving and winding up the completed net as it comes from the pegged cylinder.

In witness whereof I have hereunto set my hand.

MATHIAS JENSEN.

Witnesses:
 WM. F. BOOTH,
 S. H. NOURSE.